United States Patent
Lloyd et al.

(10) Patent No.: US 12,142,387 B2
(45) Date of Patent: Nov. 12, 2024

(54) COOLING ARRANGEMENT FOR DRY FUEL STORAGE

(71) Applicant: Westinghouse Electric Company LLC, Cranberry Township, PA (US)

(72) Inventors: Timothy M. Lloyd, Pittsburgh, PA (US); Robert Quinn, Morgan Hill, CA (US); Emmanuel Mercier, Athis Mons (FR); David Castrillon Cabeleiro, Cantabria (ES); Luis Moreno Pombo, Cantabria (ES)

(73) Assignee: Westinghouse Electric Company LLC, Cranberry Township, PA (US)

( * ) Notice: Subject to any disclaimer, the term of this patent is extended or adjusted under 35 U.S.C. 154(b) by 139 days.

(21) Appl. No.: 17/904,058

(22) PCT Filed: Feb. 4, 2021

(86) PCT No.: PCT/US2021/016615
§ 371 (c)(1),
(2) Date: Aug. 11, 2022

(87) PCT Pub. No.: WO2021/162934
PCT Pub. Date: Aug. 19, 2021

(65) Prior Publication Data
US 2023/0136825 A1    May 4, 2023

Related U.S. Application Data

(60) Provisional application No. 62/976,021, filed on Feb. 13, 2020.

(51) Int. Cl.
*G21F 5/008* (2006.01)
*G21F 5/10* (2006.01)

(52) U.S. Cl.
CPC ............ *G21F 5/008* (2013.01); *G21F 5/10* (2013.01)

(58) Field of Classification Search
CPC ... G21F 5/008; G21F 5/10; G21F 5/06; G21C 19/07; G21C 19/40
(Continued)

(56) References Cited

U.S. PATENT DOCUMENTS 9,514,853 B2   12/2016  Singh et al.
11,232,877 B2   1/2022  Rico Arenal et al.
(Continued)

FOREIGN PATENT DOCUMENTS

WO    2020016466 A1    1/2020
WO    2021162934 A1    8/2021

OTHER PUBLICATIONS

International Search Report and Written Opinion for International PCT Application No. PCT/US2021/016615, dated Jun. 24, 2021.

*Primary Examiner* — Peter M Poon
*Assistant Examiner* — Daniel Wasil
(74) *Attorney, Agent, or Firm* — K&L Gates LLP

(57) ABSTRACT

A nuclear component handling arrangement is disclosed including a storage overpack including an inner envelope, an inner canister including an outer envelope, and a vent and duct system. The inner canister is positionable within the storage overpack. The vent and duct system includes an inlet vent, an outlet vent, and a passageway defined between the inner envelope of the storage overpack and the outer envelope of the inner canister. The passageway extends between the inlet vent and the outlet vent. The inlet vent includes an inlet entrance, an inlet exit, and a curved transition surface extending between the inlet entrance and the inlet exit.

18 Claims, 9 Drawing Sheets

(58) Field of Classification Search
USPC .......................................................... 376/272
See application file for complete search history.

(56) References Cited

U.S. PATENT DOCUMENTS

| | | |
|---|---|---|
| 2014/0247916 A1 | 9/2014 | Singh et al. |
| 2019/0103197 A1 | 4/2019 | Singh et al. |
| 2019/0139661 A1* | 5/2019 | Singh ....................... G21F 5/008 |
| 2021/0057118 A1* | 2/2021 | Singh ....................... G21F 5/005 |
| 2021/0225537 A1* | 7/2021 | Singh ......................... G21F 5/10 |

* cited by examiner

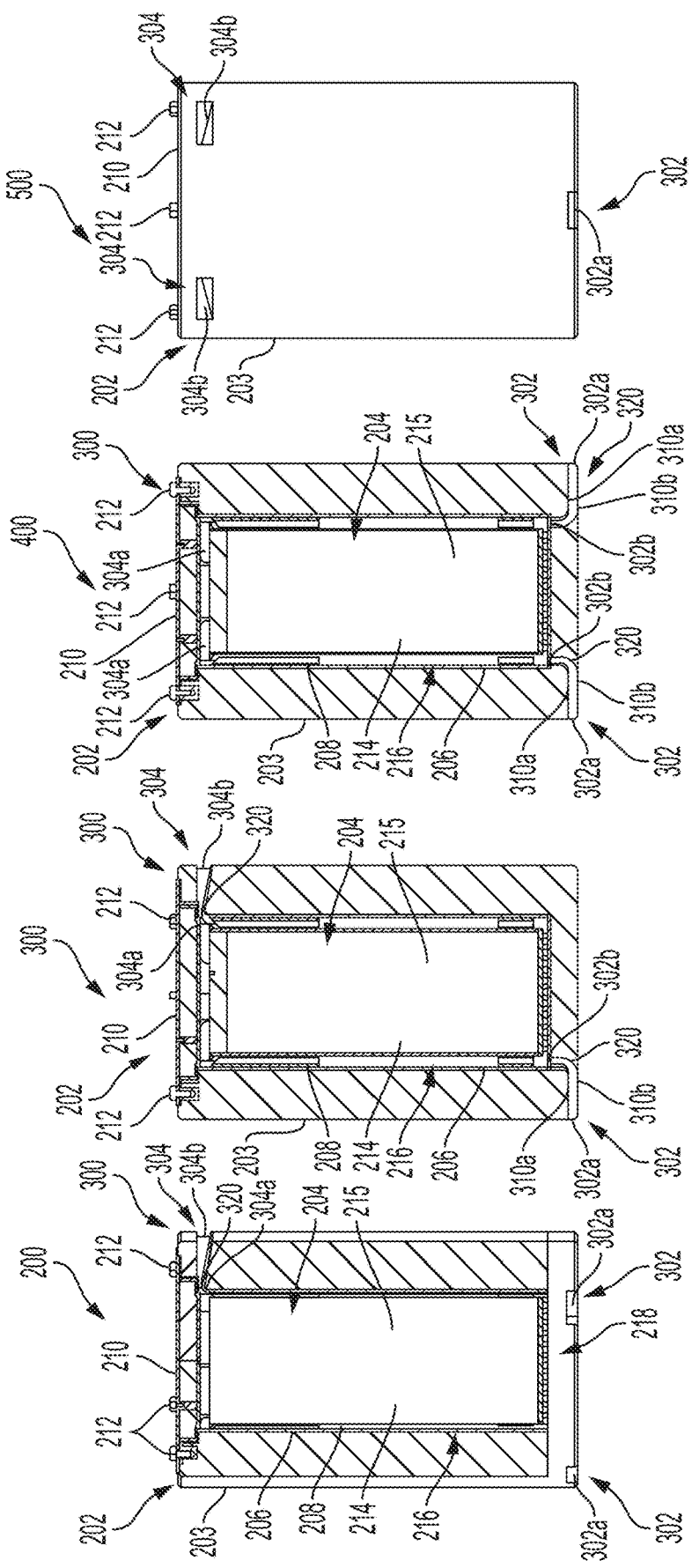

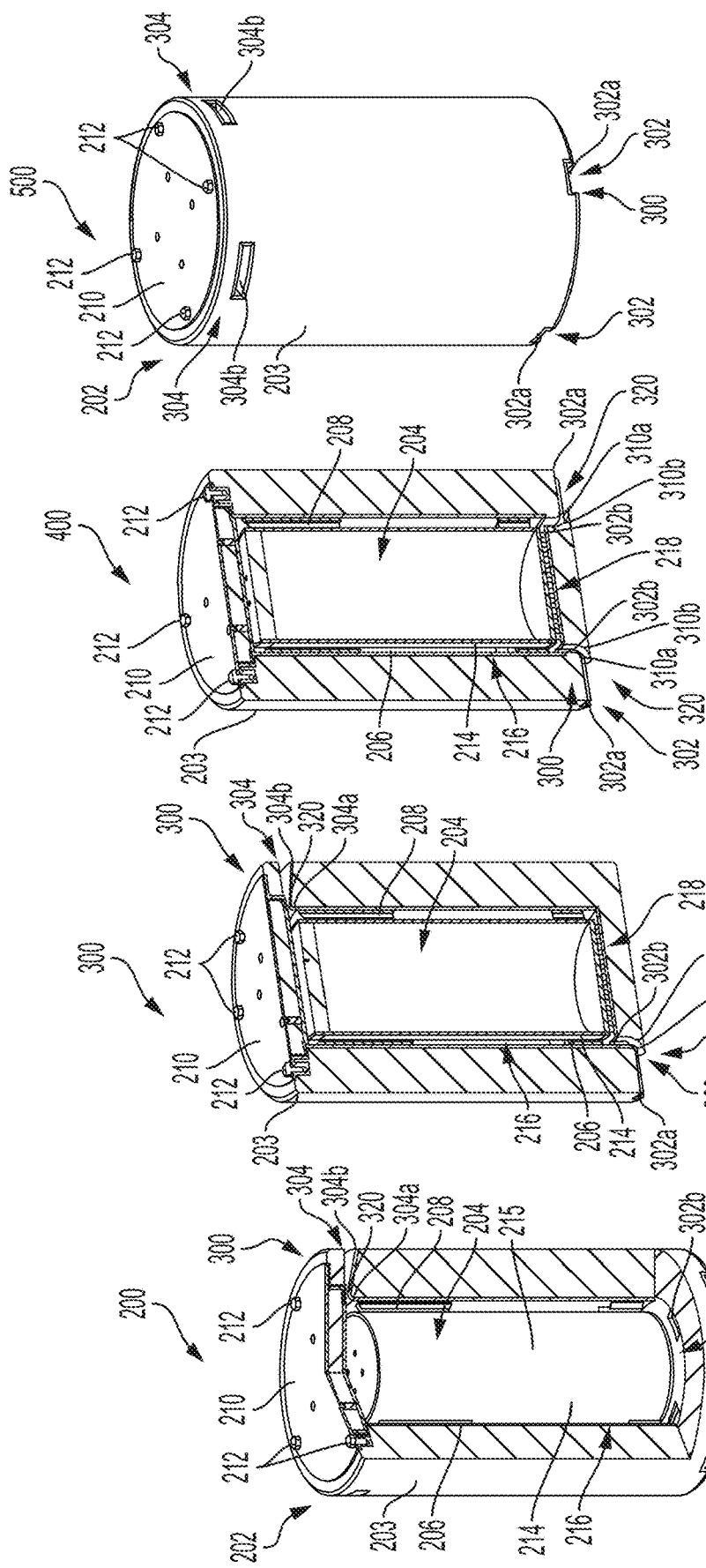

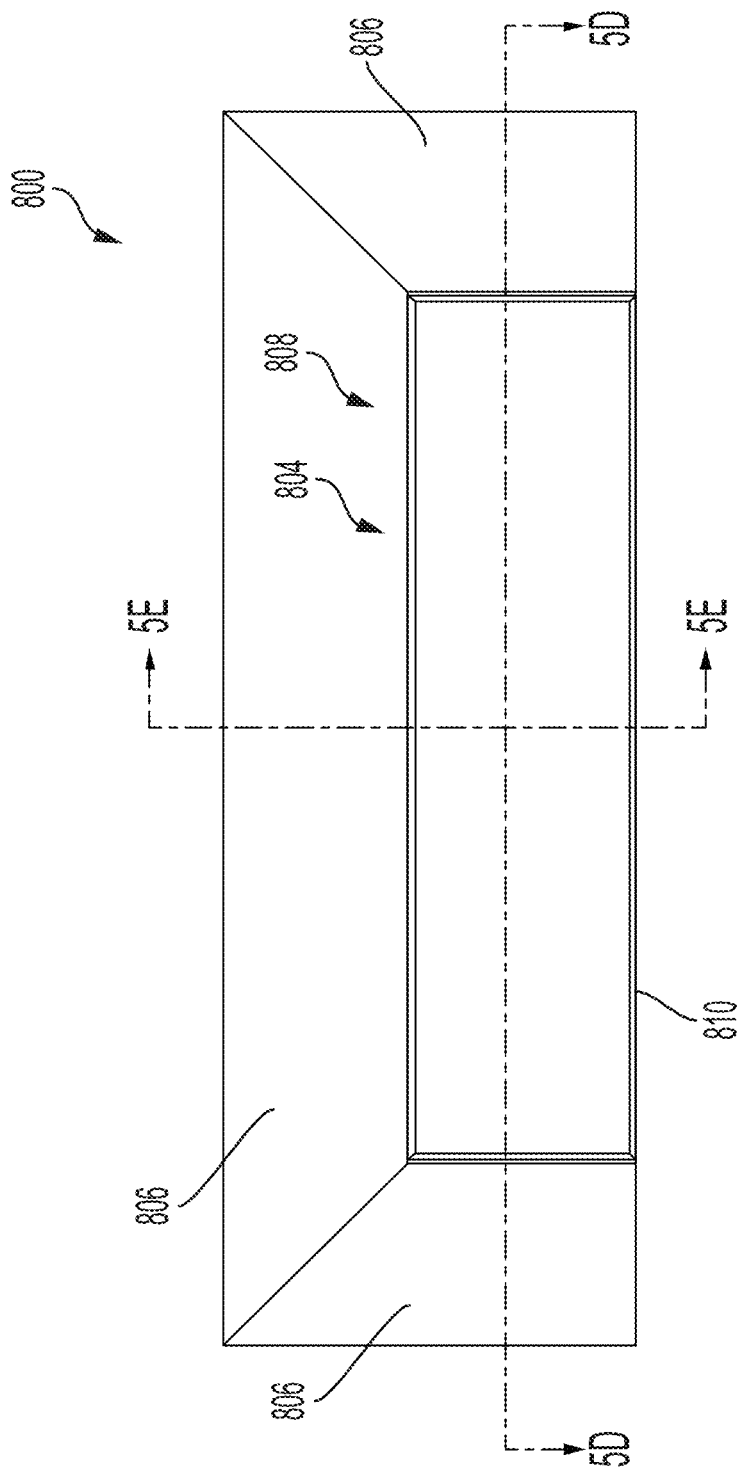

COOLING ARRANGEMENT FOR DRY FUEL STORAGE

CROSS-REFERENCE TO RELATED APPLICATIONS

This application is a U.S. National Stage Entry under 35 U.S.C. § 371 of International Patent Application No. PCT/US2021/016615, entitled COOLING ENHANCEMENTS FOR DRY FUEL STORAGE, filed Feb. 4, 2021, which claims the benefit under 35 U.S.C. § 119 (e) to U.S. Provisional Application Ser. No. 62/976,021 filed Feb. 13, 2020, the entire disclosures of which are hereby incorporated by reference herein.

BACKGROUND

The present invention relates to spent nuclear fuel storage systems.

FIG. 1 illustrates a typical pressurized water nuclear reactor fuel assembly 20 for supplying nuclear fuel to a reactor. Fuel assembly 20 includes a bottom nozzle 22 and a top nozzle 24. Elongated fuel rods 26 are disposed between the bottom nozzle 22 and the top nozzle 24. Each fuel rod 26 includes a cylindrical housing made of zirconium alloy such as commercially available "zircaloy-4", and is filled with pellets of fissionable fuel enriched with U-235. Within the assembly of fuel rods 26, tubular guides (not shown) are disposed between nozzles 22 and 24 to accommodate movably mounted control rods (not illustrated) and measuring instruments (not illustrated). The ends of these tubular guides are attached to nozzles 22 and 24 to form a skeletal support for fuel rods 26, which are not permanently attached to nozzles 22 and 24. Grid members 28 have apertures through which fuel rods 26 and the tubular guides extend to bundle these elements together. Commercially available fuel assemblies include between 179 and 264 fuel rods, depending upon the particular design. A typical PWR fuel assembly, for example, is about 4.1 meters long, about 19.7 cm wide, and has a mass of about 585 kg.

After a typical service life of 4-5 years in a pressurized water reactor (PWR), the U-235 enrichment of a fuel assembly 20 is depleted. Furthermore, a variety of fission products, having various half-lives, are present in rods 26. These fission products generate intense radioactivity and heat when assemblies 20 are removed from the reactor, and accordingly the assemblies 20 are moved to a pool containing boron salts dissolved in water for short-term storage. Such a pool is designated by reference number 30 in FIG. 2.

Pool 30 is typically 12.2 meters deep. A number of spent fuel racks 32 positioned at the bottom of pool 30 are provided with storage slots 34 that vertically accommodate fuel assemblies 20. A cask pad 36 is located at the bottom of pool 30.

During the period when fuel assemblies 20 are stored in pool 30, the composition of the spent fuel in rods 26 changes. Isotopes with short half-lives decay, and consequently the proportion of fission products having relatively long half-lives increases. Accordingly, the level of radioactivity and heat generated by a fuel assembly 20 decreases relatively rapidly for a period and eventually reaches a state wherein the heat and radioactivity decrease very slowly. Even at this reduced level, however, rods 26 must be reliably isolated from the environment for the indefinite future.

Dry storage casks provide one form of long-term storage for the spent fuel. After the heat generated by each fuel assembly 20 falls to a predetermined amount—such as 0.5 to 1.0 kilowatt per assembly, after perhaps 10 years of storage in pool 30—an opened cask is lowered into a spent fuel pool. By remote control the spent fuel is transferred to the cask, which is then removed from pool 30, sealed, and drained of spent fuel pool water. The cask can then be suitably processed and transported to an above-ground storage area for long-term storage.

The requirements which must be imposed on such a cask are rather severe. The cask must be immune from chemical attack during long-term storage. Furthermore, it must be sufficiently rugged mechanically to avoid even tiny ruptures or fractures during long-term storage and during transportation, when the cask might be subjected to rough treatment or accidents such as drops. Moreover, the cask must be able to transmit heat generated by the spent fuel to the environment while nevertheless shielding the environment from radiation generated by the spent fuel. The temperature of the rods 26 must be kept below a maximum temperature, such as 400° C., to prevent deterioration of the zirconium alloy housing. Provisions must also be made to ensure that a chain reaction cannot be sustained within the cask; that is, that the effective criticality factor $K_{eff}$ remains less than one so that a self-sustaining reaction does not occur. These requirements impose stringent demands upon the cask, which must fulfill its storage function in an utterly reliable manner.

A modular dry spent fuel canister system is a system in which one of several different types of inner spent nuclear fuel canisters (typically welded stainless or carbon steel right circular cylinders) can be loaded into one of an outer cask family, depending on the stage of storage the inner canister is undergoing. This family of outer casks would typically include a storage overpack for long term dry storage, a transfer cask for transferring the fuel assemblies out of the spent fuel pool, and a transportation cask for shipping the fuel assemblies to a different storage location. For a modular system, the various canisters can be loaded interchangeably into the different types of outer casks.

As presently supplied modular spent fuel canister systems offer an inner canister designed for one type of spent fuel or another (e.g., BWR, PWR, PWR XL, or VVER fuel), or Greater than Class C Waste (GTCC). However, the industry would be better served if various canisters were designed for a focused engineering objective or criterion that would apply to the high level waste being stored rather than simply to the type of spent radioactive waste being stored.

Commonly owned U.S. patent application Ser. No. 16/257,776, titled "DUEL-CRITERION FUEL CANISTER SYSTEM", which published as U.S. Patent Application Publication No. 2019/0237210 on Aug. 1, 2019, which is incorporated by reference in its entirety herein, discloses a minimum cooling time canister (MCTC) that provides various enhancements to reduce the cooling time or radioactive decay time that must pass before the MCTC can be moved to a new location so as to meet the decay heat requirements and capabilities of the new location.

One such enhancement is a vent and duct system 110, illustrated in FIG. 3, between an inner canister 142 and a storage overpack 112 that configured to remove heat from the inner canister 142. The vent and duct system 130 includes an intake 132 defined in a lower portion of a storage overpack 112, an outlet 134 defined in an upper portion of the storage overpack 112, and a duct 136 extending between the intake 132 and the outlet 134 between an inner side (not numbered) of the storage overpack 112 an outer side (not numbered) of the inner canister 142. In one embodiment, the duct 136 is an annular passage between the storage overpack 112 and the inner canister 142. This technology represents the ability of the system to use natural convection to remove heat from the surface of the inner canister 142. In one embodiment, an annular gap is provided between the inside wall of the storage overpack 112 and the outside wall of the MCTC 142 with the duct and vent system 130 that removes heat from the inner canister surface as well as the storage overpack 112.

It is desirable to improve upon the vent and duct system by providing a storage overpack that increases airflow through the annular passageway to further reduce cooling times, as well as improves radiation shielding to reduce radiation exposure generated by the spent fuel.

SUMMARY

The present invention achieves the foregoing objectives by providing a storage overpack with inlet vents and outlet vents with curved transitions, which result in an improved airflow compared to vents with straight edges and elbows. The present invention also provides horns that can mount to the inlet vents and outlet vents to improve airflow through an annular passage of a storage overpack.

In various embodiments, a nuclear component handling arrangement is disclosed including a storage overpack including an inner envelope, an inner canister including an outer envelope, wherein the inner canister is positionable within the storage overpack, and a vent and duct system including an inlet vent, an outlet vent, and a passageway defined between the inner envelope of the storage overpack and the outer envelope of the inner canister. The inlet vent includes an inlet entrance, an inlet exit, and a curved transition surface extending between the inlet entrance and the inlet exit. The passageway extends between the inlet vent and the outlet vent.

In various embodiments, a nuclear component handling arrangement is disclosed including a storage overpack including an inner envelope, an inner canister including an outer envelope, wherein the inner canister is positionable within the storage overpack, and a passive cooling system including an inlet vent, an outlet vent, and a duct defined between the inner envelope of the storage overpack and the outer envelope of the inner canister. The inlet vent includes an inlet entrance portion, an inlet exit portion, and a curved portion connecting the inlet entrance portion and the inlet exit portion. The duct extends between the inlet vent and the outlet vent.

In various embodiments, a nuclear component handling arrangement for housing a canister containing nuclear waste is disclosed. The nuclear component handling arrangement includes a storage overpack including an inner envelope, wherein the canister is positionable within the storage overpack, and a passive cooling system comprising an inlet vent, an outlet vent, and a duct extending between the inlet vent and the outlet vent. The inlet vent includes an inlet horn, an inlet exit portion, and a curved portion connecting the inlet horn and the inlet exit portion.

BRIEF DESCRIPTION OF THE DRAWINGS

Various features of the embodiments described herein, together with advantages thereof, may be understood in accordance with the following description taken in conjunction with the accompanying drawings as follows:

FIG. 4A is one embodiment of a nuclear component handling arrangement with a portion of the cask housing removed, according to one aspect of the present disclose.

FIG. 4B is an isometric view of the nuclear component handling arrangement of FIG. 4A, according to one aspect of the present disclose.

FIG. 4C is another embodiment of the nuclear component handling arrangement with a portion of the cask housing removed, according to one aspect of the present disclose.

FIG. 4D is an isometric view of the nuclear component handling arrangement of FIG. 4C, according to one aspect of the present disclose.

FIG. 4E is another embodiment of the nuclear component handling arrangement with a portion of the cask housing removed, according to one aspect of the present disclose.

FIG. 4F is an isometric view of the nuclear component handling arrangement of FIG. 4E, according to one aspect of the present disclose.

FIG. 4G is an embodiment of the nuclear component handling arrangement, according to one aspect of the present disclose.

FIG. 4H is an isometric view of the nuclear component handling arrangement of FIG. 4G, according to one aspect of the present disclose.

FIG. 5C is a back view of a horn, according to one aspect of the present disclose.

Corresponding reference characters indicate corresponding parts throughout the several views. The exemplifications set out herein illustrate various embodiments of the invention, in one form, and such exemplifications are not to be construed as limiting the scope of the invention in any manner.

DETAILED DESCRIPTION

Before explaining various aspects of a nuclear component handling arrangement in detail, it should be noted that the illustrative examples are not limited in application or use to the details of construction and arrangement of parts illustrated in the accompanying drawings and description. The illustrative examples may be implemented or incorporated in other aspects, variations, and modifications, and may be practiced or carried out in various ways. Further, unless otherwise indicated, the terms and expressions employed herein have been chosen for the purpose of describing the illustrative examples for the convenience of the reader and are not for the purpose of limitation thereof. Also, it will be appreciated that one or more of the following-described aspects, expressions of aspects, and/or examples, can be combined with any one or more of the other following-described aspects, expressions of aspects, and/or examples.

Figure 1:
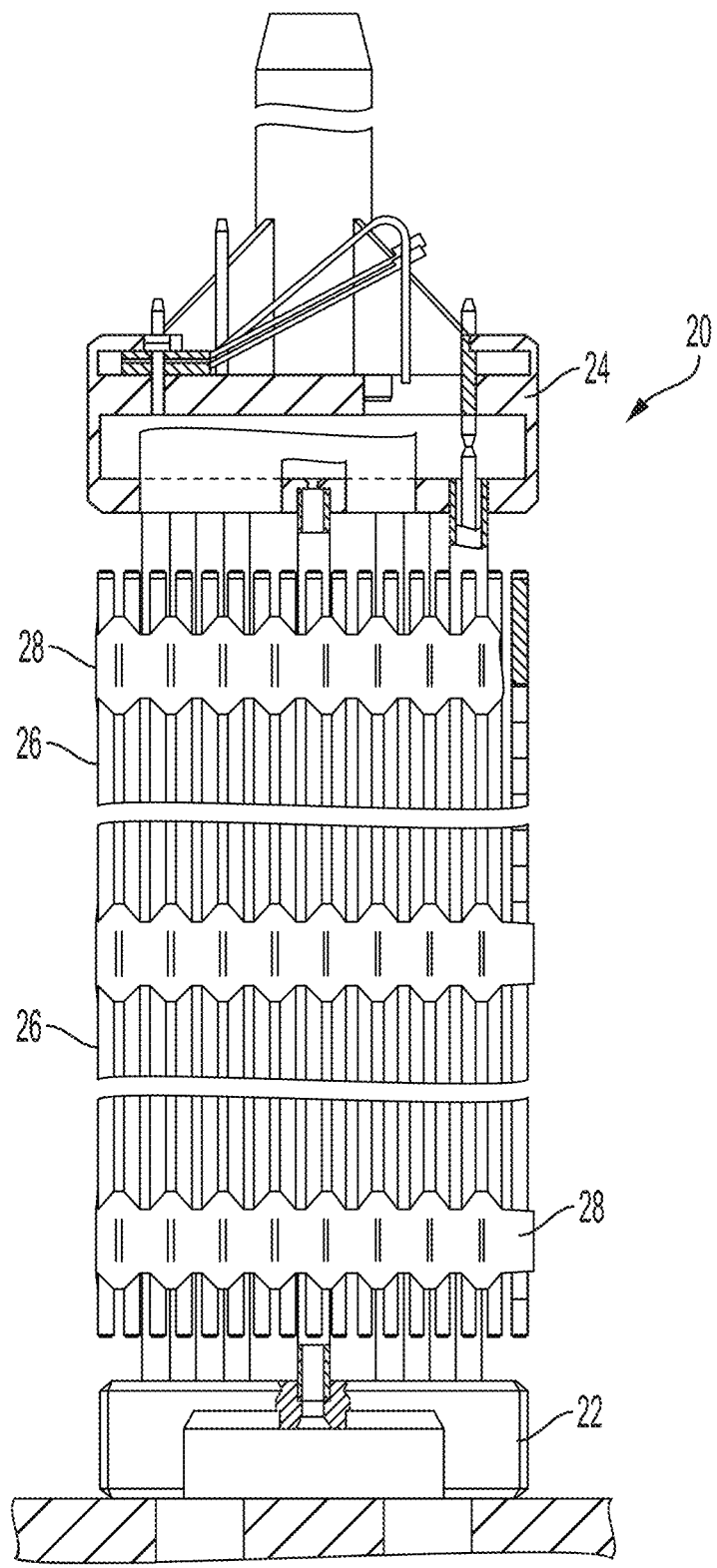
FIG. 1 is an elevation view of a typical pressurized water reactor fuel assembly.
Figure 2:
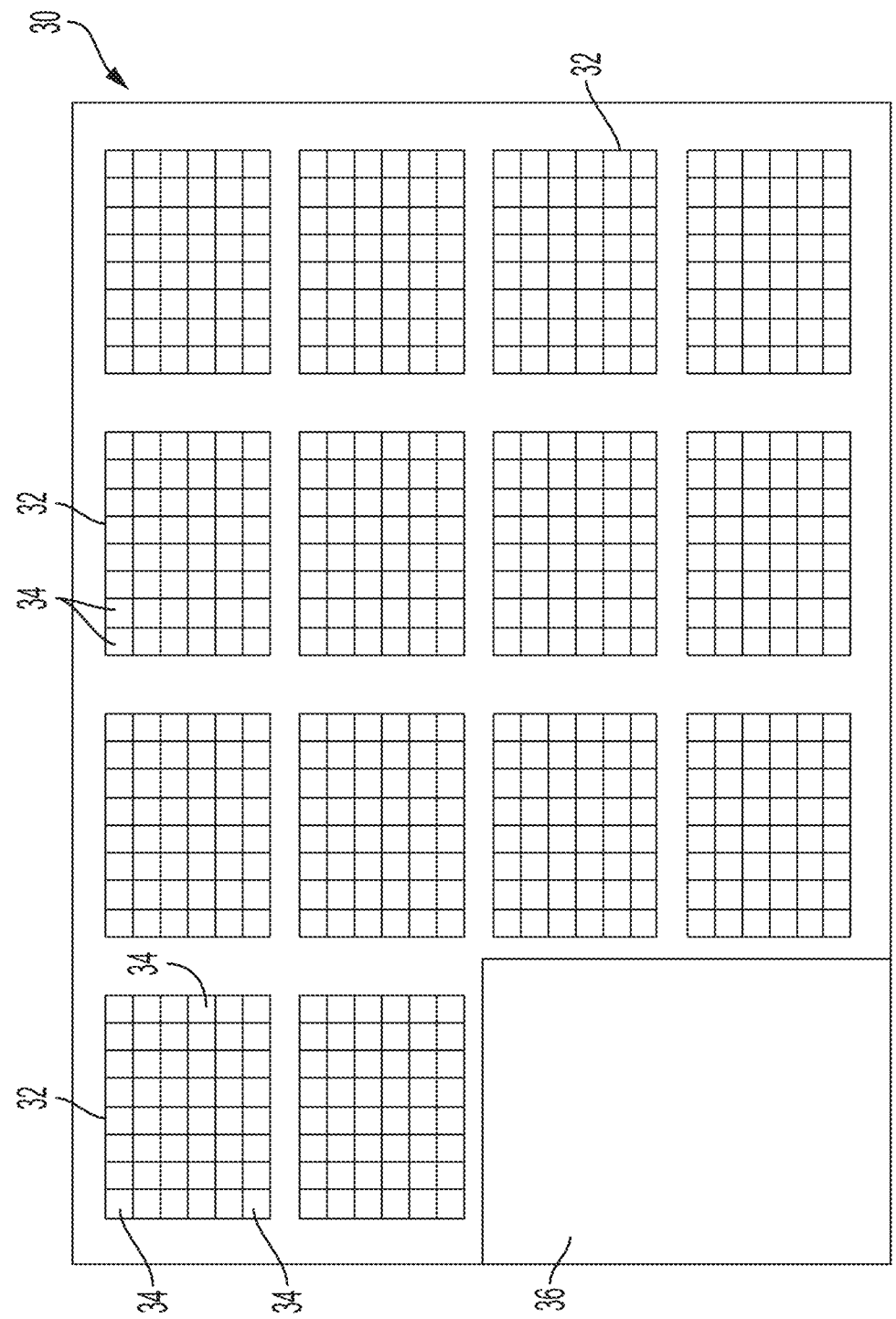
FIG. 2 is a top plan view of a pool for short-term storage of spent fuel assemblies.
Figure 3:
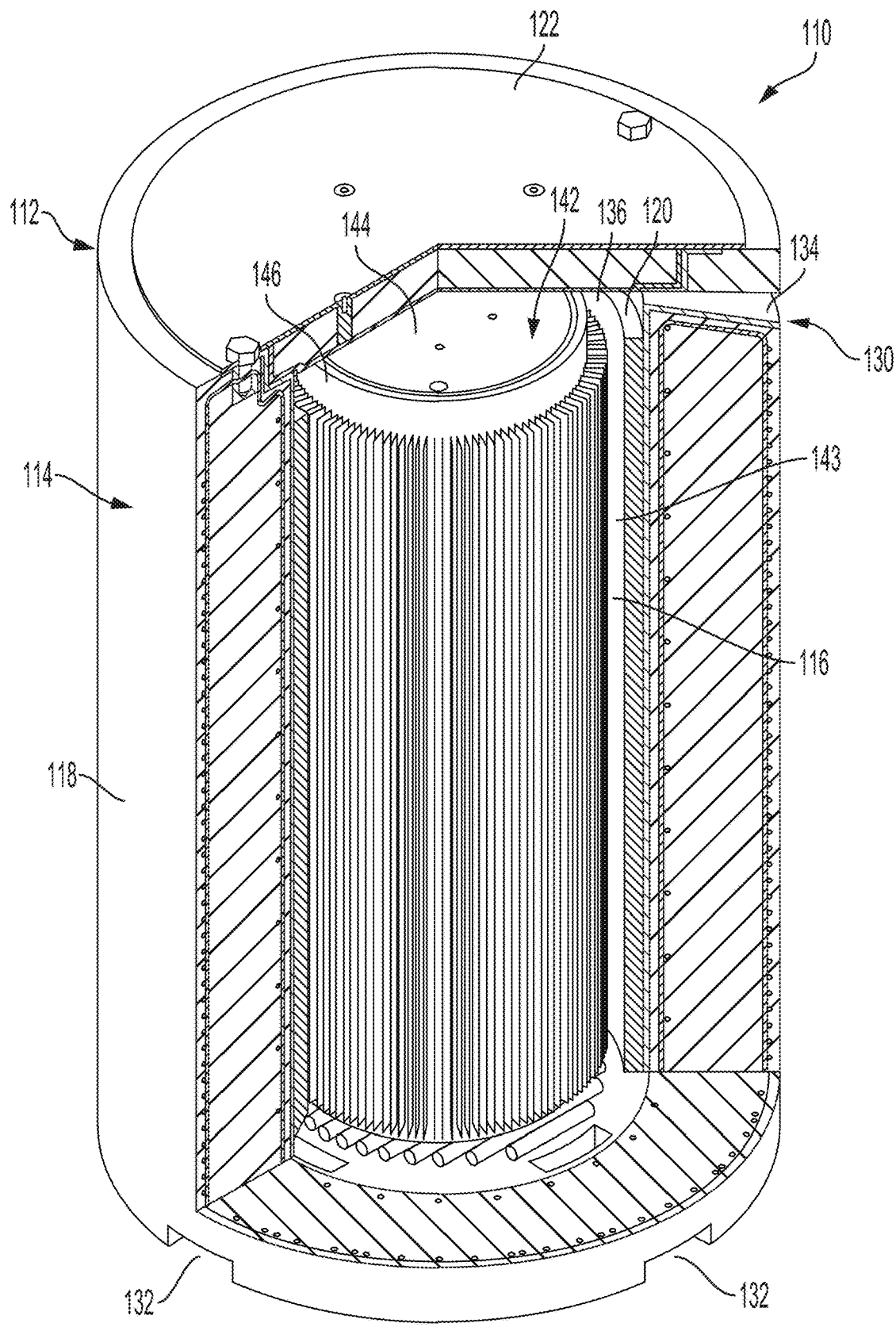
FIG. 3 is an isometric view of a dry nuclear component handling arrangement shown with a portion of an outer cask thereof sectionally removed in order to show details of the outer cask as well as an inner canister of the arrangement.
Figure 4J:
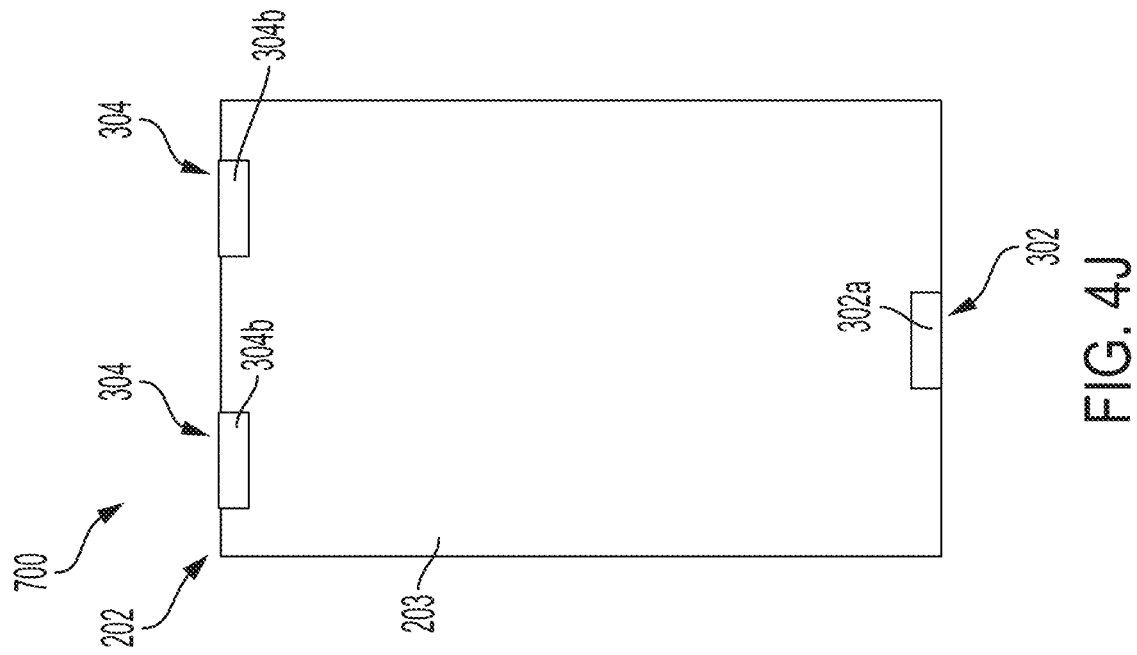
FIG. 4J is an embodiment of the nuclear component handling arrangement with angularly offset inlet and outlet vents, according to one aspect of the present disclose.
Figure 4I:
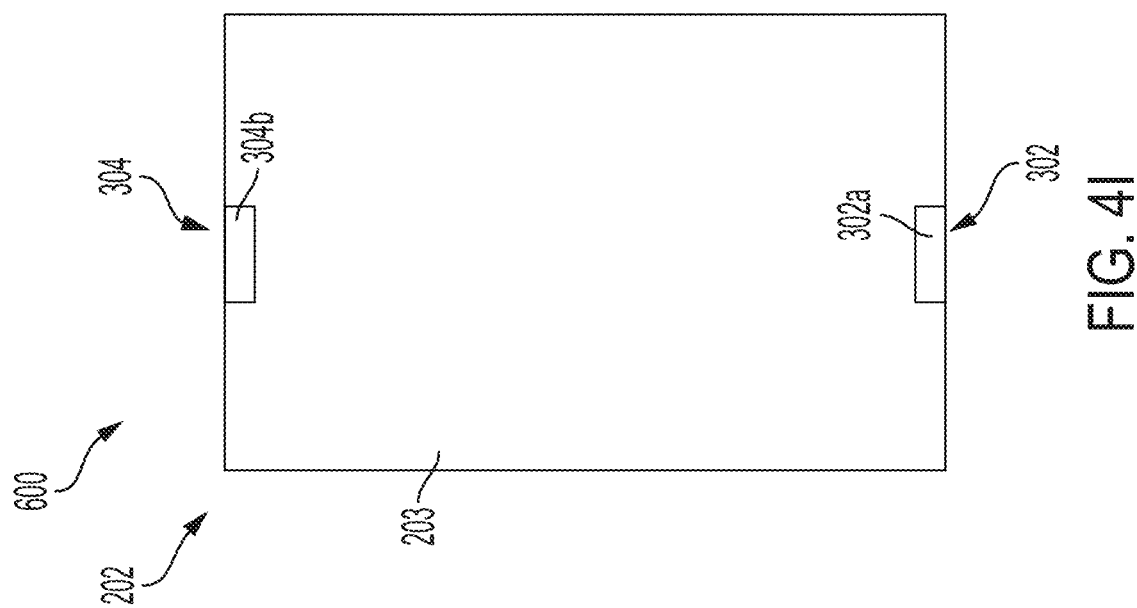
FIG. 4I is an embodiment of the nuclear component handling arrangement with vertically aligned inlet and outlet vents, according to one aspect of the present disclose.
Figure 5B:
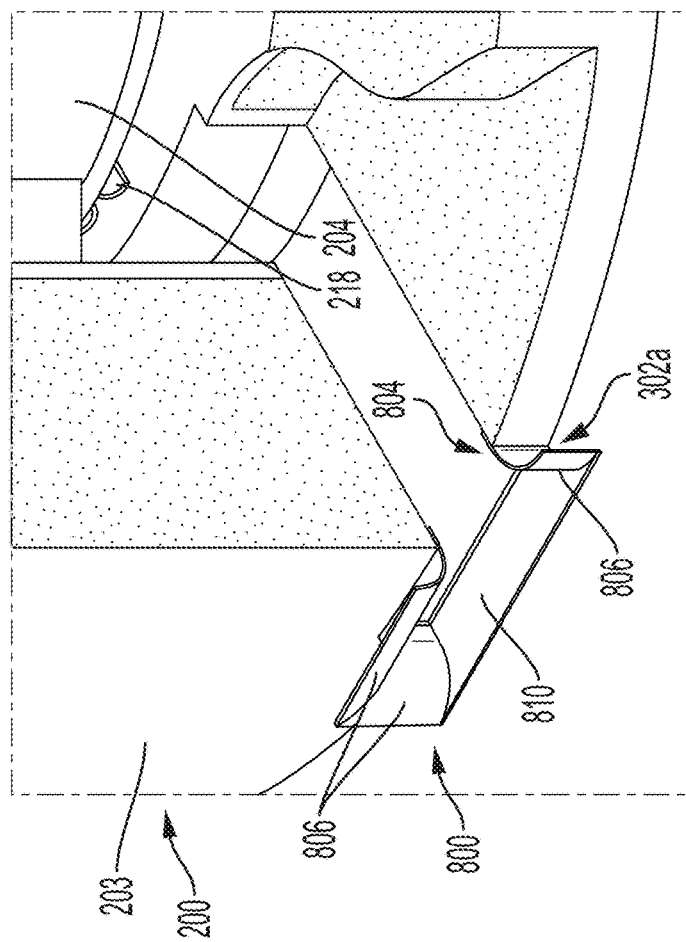
FIG. 5B is one embodiment of a horn coupled with an inlet vent of a nuclear component handling arrangement, according to one aspect of the present disclose.
Figure 5A:
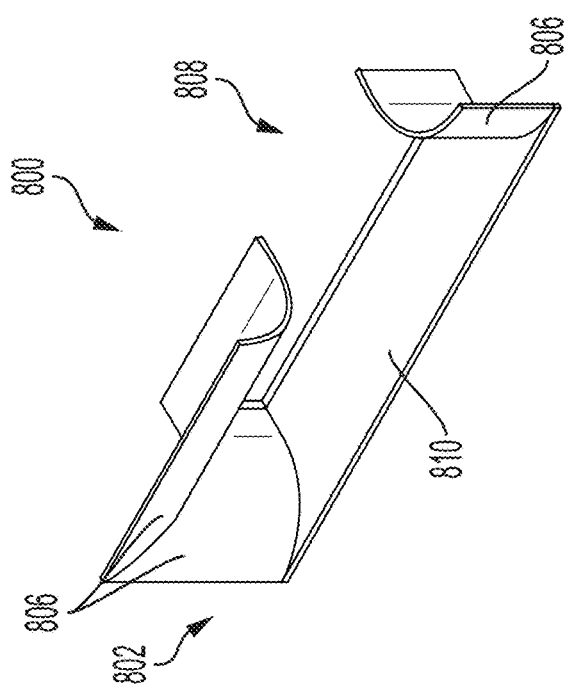
FIG. 5A is one embodiment of a horn configured for use with a nuclear component handling arrangement, according to one aspect of the present disclose.
Figure 5D:
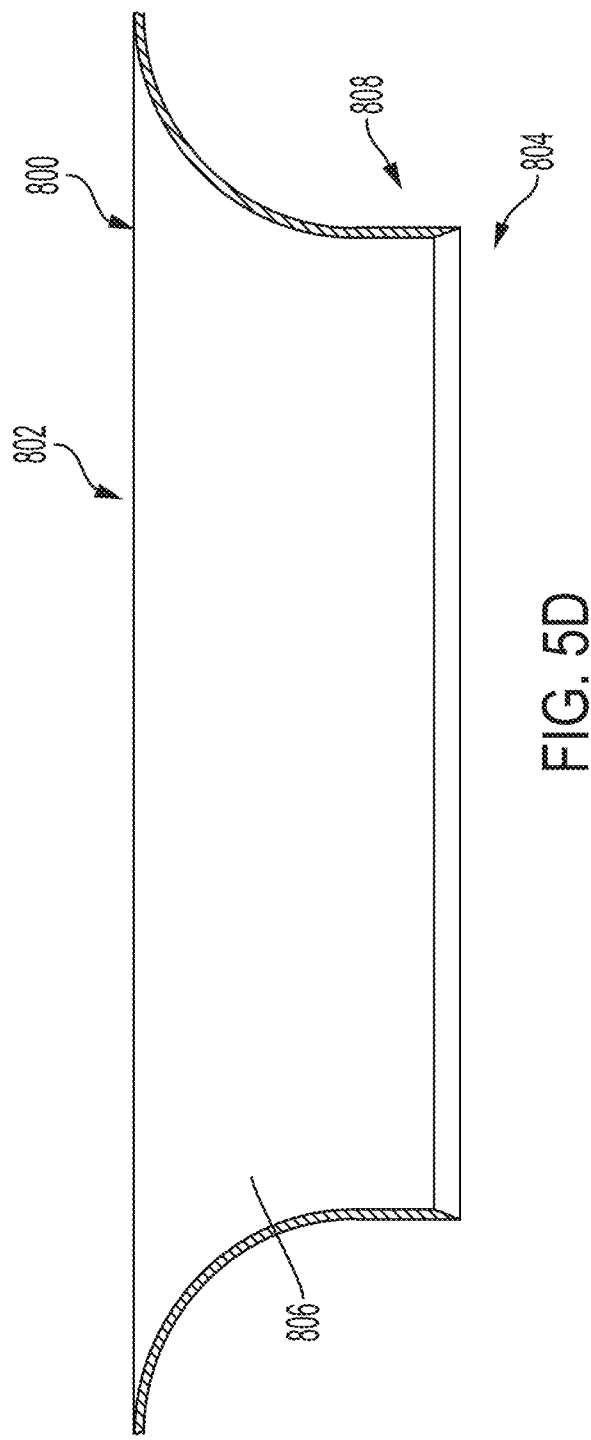
FIG. 5D is a top cross-sectional view of the horn of FIG. 5C, according to one aspect of the present disclose.
Figure 5F:
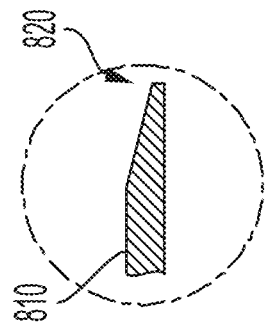
FIG. 5F is an enlarged portion of the horn of FIG. 5E, according to one aspect of the present disclose.
Figure 5E:
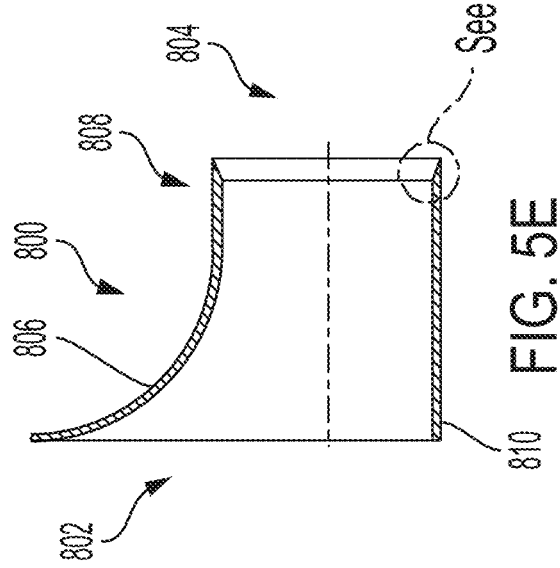
FIG. 5E is a side cross-sectional view of the horn of FIG. 5C, according to one aspect of the present disclose.

FIGS. 4A and 4B illustrate a nuclear component handling arrangement 200 in accordance with one non-limiting embodiment of the present disclosure. While the following discussion is made in reference to FIGS. 4A and 4B, several other nuclear component handling arrangements 300, 400, 500, 600, 700 in accordance with other non-limiting embodiments of the present disclosure, illustrated in FIGS. 4C-4J, are provided. Similar components described hereinbelow are similarly labeled in FIGS. 4C-4J. Referring to FIGS. 4A and 4B, the arrangement 200 includes an outer cask 202 (referred to herein as a "storage overpack") and an inner canister 204 selectively disposed within the storage overpack 202. The storage overpack 202 includes a cask housing 203 defining an interior envelope 206 that is generally cylindrical in shape. The cask housing 204 can generally include a cylindrical-shaped concrete body, a tubular-shaped auxiliary shielding shell 208 disposed internally and being generally concentric with the housing 203, and a storage lid 210 which is selectively coupled to cask housing 203 via bolts 212 or other suitable coupling mechanisms. The shielding shell 208 assists with performing shielding functions.

The inner canister 204 has a canister housing 214 which is configured to store a quantity of irradiated nuclear plant components or high level waste, such as a plurality of PWR fuel assemblies and/or a plurality of Boiling Water Reactor (BWR) fuel assemblies therein. Furthermore, the canister housing 214 has an outer envelope 215, generally cylindrical in shape, which is configured to fit within the interior envelope 206 of the storage overpack 202. An annular duct, gap or passage 216 is defined between the interior envelope 206 of the storage overpack 202 and the outer envelope 215 of the canister housing 204. In addition, pipes 218 can be disposed between a base of the inner canister 204 and the floor of the storage overpack 202 to provide additional structural support to the nuclear component handling arrangement 200 and to provide support to the inner canister 204 within the storage overpack 202.

The nuclear component handling arrangement 200 can further include a vent and duct system 300 that is configured to remove heat from the inner canister 204. The vent and duct system 300 includes at least one inlet vent 302 defined in a bottom portion of the storage overpack 202 and at least one outlet vent 304 defined in an upper portion of the storage overpack 202. In one embodiment, the inlet vents 304 and outlet vents 304 can be defined along the bottom portion of the storage overpack 202 and top portion of the storage overpack 202, respectively. In other embodiments, the inlet vents 302 and outlet vents 304 can be defined at other locations other than the bottom portion and top portion of the storage overpack 202, respectively, such as at various locations along the height of the cask housing 203. The vent and duct system 300 can include any number of inlet vents 302 and outlet vents 304 disposed about the storage overpack 202 to facilitate adequate airflow therethrough and over the inner canister 204. In one embodiment, the vent and duct system 300 can have an identical number of inlet vents 302 and outlet vents 304. In another embodiment, the vent and duct system 300 can have more inlet vents 302 than outlet vents 304. In another embodiment, the vent and duct system 300 can have more outlet vents 304 than inlet vents 302. In one embodiment, referring to FIG. 4I, a nuclear component handling arrangement 600 can include inlet vents 302 and outlet vents 304 that can be substantially vertically aligned. In another embodiment, referring to FIGS. 4J, a nuclear component handling arrangement 700 can include inlet vents 302 and outlet vents 304 that can be angularly offset about the circumference of the storage overpack 202 with respect to one another such that the inlet vents 302 and outlet vents 304 are not vertically aligned. In one example embodiment, a storage overpack 202 can include inlet vents 302 and outlet vents 304 that are 30° offset about the circumference of the storage overpack 202. In another example embodiment, a storage overpack 202 can include inlet vents 302 and outlet vents 304 that are 45° offset about the circumference of the storage overpack 202. In another example embodiment, a storage overpack 202 can include inlet vents 302 and outlet vents 304 that are 15° offset about the circumference of the storage overpack 202.

In use, the vent and duct system 300 makes use of natural convection to remove the heat from the inner canister 204 through the "smokestack" effect of heating air expanding, and thus producing a pressure gradient capable of driving an upward-rising airflow. The gradient causes air to enter through the inlet vents 302, travel through the annular passage 216 between the interior envelope 206 of the storage overpack 202 and the outer envelope 215 of the inner canister 204, and exit through the outlet vents 304. In one embodiment, the air is to enter the inlet vent 302 substantially horizontally and exit substantially vertically into the annular passageway 216 (conversely for the outlet vents). In other embodiments, the air is to enter and exit the vents 302, 304 at angles relative to the base of the storage overpack 202.

Unlike other systems, referring to FIG. 4D, as an example, the present disclosure provides inlet vents 302 and outlet vents 304 with curved transitions 320. Other existing systems make use of sharp turns and directional changes, which results in higher frictional resistance on air traveling through the storage overpack 202. The use of curved transitions makes use of air circulation pathways more conducive to optimal airflow and substantially lowers friction losses, resulting in an improved airflow, higher velocities, and commensurately enhanced heat removable compared to vents with straight vents and sharp turns. Such a configuration allows for the establishment of substantially greater heat losses through the nuclear component handling arrangement 200, which aids in accommodating significantly higher heat loads for the spent fuel contents of the inner canister 204.

In addition, the use of curved transitions can result in improved radiation shielding when compared to vents with straight vents and sharp turns. In order to facilitate improved radiation shielding, it is important that the entrances to the inlet vents 302a and the exits of the outlet vents 304b be small such that radiation is prevented from leaking out of the nuclear component handling arrangement 200. In one aspect, the entrance to the vents 302a, 304a can have a first cross-sectional area and the exit of the vents 302b, 304b can have a second cross-sectional area. In one embodiment, the first cross-sectional area and the second cross-sectional area can be substantially the same. In another embodiment, the first cross-sectional area and the second cross-sectional area can be different. In one embodiment, the cross-sectional areas of the entrances of the inlet vents 302a and the outlet vents 304a can be different. In another embodiment, the cross-sectional areas of the exits of the inlet vents 302b and the outlet vents 304b can be different.

In one aspect, the vents 302, 304 can have a rectangular cross sectional shape. In another aspect, the vents 302, 304 can have a square cross-sectional shape. In another aspect, the vents 302, 304 can have a circular cross sectional shape. In one embodiment, the inlet vent 302 can maintain a uniform cross sectional shape and the outlet vent 304 can maintain the same, or a different, cross sectional shape. In one embodiment, the entrance to the vents 302a, 304a can have one cross sectional shape and the exit to the vents 302b, 304b can have a different cross sectional shape.

In another aspect, the inlet vents 302 and outlet vents 304 can have curved transition surfaces, such as first transition surface 310a and second transition surface 310b that each transition from the entrance of vent 302a to the exit of vent 302b. In one embodiment, the radius of curvature of the first transition surface 310a and the radius of curvature of the second transition surface 310b can be identical. In another embodiment, the radius of curvature of the first transition surface 310a and the radius of curvature of the second transition surface 310b can be different. The vents 302, 304 can have any number of transition surfaces between the entrance of the vents 302a, 304a and the exit of the vents 302b, 304b to facilitate an increase in airflow through the nuclear component handling arrangement 200. In addition, the transition surfaces 310a, 310b can include both straight portions and curved portions, such that the air transitions from the substantially horizontal direction to the substantially vertical direction over only a portion of the distance between the entrance and the exit of the vents. In other embodiments, the transition surfaces 310a, 310b only include curved portions.

In another aspect of the present disclosure, referring now to FIGS. 5A-5F, a horn 800 is provided that can be configured for use with the vent and duct system 300 described hereinabove. The horn 800 is configured to further facilitate an increase in airflow through the nuclear component handling arrangement 200. Similar to the vent and duct system 300, the horn comprises inlets 802 and outlets 804 with curved transitions 806 to facilitate a reduction in friction experienced by the air.

The horn 800 is configured to be coupled with the entrance of the inlet vents 302a and exits of the outlet vents 304b at an interface 808. The interface 808 is configured to couple to the vents 302, 306 by press-fit, friction-fit, a latch mechanism, a fastening mechanism, an adhesive, or any other suitable coupling mechanism to couple the horns 800 to the vents 302a, 304b. In one aspect, horns 800 can be coupled to each of the inlet vents 302 and outlet vents 304. In another aspect, horns 800 can be coupled to only the inlet vents 302. In another aspect, horns can be coupled to only the outlet vents 304. In another aspect, horns 800 can be selectively coupled to some inlet vents 302 and some outlet vents 304.

In various embodiments, the horn 800 includes a first cross-sectional area at the inlet 802 of the horn 800 and a second cross-sectional area at the outlet 804 of the horn 800. The second-cross sectional area at the interface 808 can be the same, or at least substantially the same, to the cross-sectional area of the entrance of the inlet vent 302a (or exits of the outlet vent 304b) to prevent air from leaking at the interface 808. In one embodiment, the first cross-sectional area and the second cross-sectional area can be the same, or at least substantially the same. In another embodiment, the first cross-sectional area and the second cross-sectional area can be different. In another embodiment, the first cross-sectional area can be greater than and the second cross-sectional area.

In one aspect, the horns 800 can have a rectangular cross sectional shape. In another aspect, the horns 800 can have a square cross-sectional shape. In another aspect, the horns 800 can have a circular cross sectional shape. In one embodiment, the inlet to the horn 802 can have one cross sectional shape and the outlet to the horn 804 can have a different cross sectional shape.

In one aspect, the horns can have a transition surface, such as transition surface 806, and a substantially flat surface, such as substantially flat surface 810. In another aspect, the horn 800 can have a plurality of transition surfaces 806 that each transition from the entrance of the horn 802 to the exit of the horn 804. In another aspect, the horns 800 can have a substantially flat surface 810 and transition surfaces 806. In another one, the horn can comprise entirely of transition surfaces 806. In another embodiment, the horns 800 can comprise entirely of substantially flat surfaces 810. In one aspect, referring to FIGS. 5E and 5F, the substantially flat surfaces 810 can comprise a transition surface 820 on the substantially flat surface 810 at the interface 808 to provide a better fit with the vents 302, 304, along with provide additional air leakage resistance.

While a vent and duct system 300 and horn 800 are described hereinabove to improve airflow and reduce cooling time to the inner canister 204, other systems and methods can be used in in tandem to further reduce the cooling time, such as outwardly extending fins on the inner canister, reduced capacity of spent fuel in the inner canister, or an active cooling system described in U.S. patent application Ser. No. 16/257,776, which has been incorporated by reference herein. Moreover, the inner canister can be structured to function as a minimum cooling time canister (MCTC) or a high capacity canister (HPC), also described in U.S. patent application Ser. No. 16/257,776.

Various aspects of the subject matter described herein are set out in the following examples.

Example 1—A nuclear component handling arrangement comprising a storage overpack comprising an inner envelope, an inner canister comprising an outer envelope, wherein the inner canister is positionable within the storage overpack, and a vent and duct system comprising an inlet vent, an outlet vent, and a passageway defined between the inner envelope of the storage overpack and the outer envelope of the inner canister. The inlet vent comprises an inlet entrance, an inlet exit, and a curved transition surface extending between the inlet entrance and the inlet exit. The passageway extends between the inlet vent and the outlet vent.

Example 2—The nuclear component handling arrangement of Example 1, wherein the outlet vent comprises an outlet entrance, an outlet exit, and a curved transition surface extending between the outlet entrance and the outlet exit.

Example 3—The nuclear component handling arrangement of Examples 1 or 2, wherein said inlet vent comprises a horn.

Example 4—The nuclear component handling arrangement of any of one Examples 1-3, wherein said outlet vent comprises a horn.

Example 5—The nuclear component handling arrangement of any of one Examples 1-4, wherein the inlet entrance comprises a first cross-sectional area, wherein the inlet exit comprises a second cross-section area, and wherein the first cross-sectional area and the second cross-sectional area are different.

Example 6—The nuclear component handling arrangement of Example 5, wherein the first cross-sectional area is less than the second cross-sectional area.

Example 7—The nuclear component handling arrangement of any of one Examples 1-6, wherein the curved transition surface is a first curved transition surface, wherein the vent and duct system comprises a second curved transition surface.

Example 8—The nuclear component handling arrangement of Example 7, wherein the first curved transition surface comprises a first radius of curvature, wherein the second curved transition surface comprises a second radius of curvature, and wherein the first radius of curvature and the second radius of curvature are different.

Example 9—A nuclear component handling arrangement comprising a storage overpack comprising an inner envelope, an inner canister comprising an outer envelope, wherein the inner canister is positionable within the storage overpack, and a passive cooling system comprising an inlet vent, an outlet vent, and a duct defined between the inner envelope of the storage overpack and the outer envelope of the inner canister. The inlet vent comprises an inlet entrance portion, an inlet exit portion, and a curved portion connecting the inlet entrance portion and the inlet exit portion. The duct extends between the inlet vent and the outlet vent.

Example 10—The nuclear component handling arrangement of Example 9, wherein the inlet entrance portion defines a horizontal passage leading to the curved portion.

Example 11—The nuclear component handling arrangement of Examples 9 or 10, wherein the inlet exit portion defines a vertical passage leading to the duct.

Example 12—The nuclear component handling arrangement of any of one Examples 9-11, wherein the duct is an annular duct.

Example 13—The nuclear component handling arrangement of any of one Examples 9-12, wherein the curved portion extends along a curved central axis, and wherein the curved portion maintains a uniform cross-sectional shape along the curved central axis.

Example 14—The nuclear component handling arrangement of any of one Examples 9-13, wherein the curved portion extends along a curved central axis, and wherein the curved portion comprises a plurality of different cross-sectional shapes along the curved central axis.

Example 15—The nuclear component handling arrangement of any of one Examples 9-14, wherein the curved portion comprises a first section and a second section narrower than the first section.

Example 16—The nuclear component handling arrangement of any of one Examples 9-15, wherein the curved portion extends along a curved central axis.

Example 17—The nuclear component handling arrangement of any of one Examples 9-16, wherein the outlet vent comprises an outlet entrance portion, an outlet exit portion, and a curved portion extending between the outlet entrance portion and the outlet exit portion.

Example 18—The nuclear component handling arrangement of any of one Examples 9-17, wherein said inlet vent comprises a horn.

Example 19—The nuclear component handling arrangement of any of one Examples 9-18, wherein said outlet vent comprises a horn.

Example 20—The nuclear component handling arrangement of any of one Examples 9-19, wherein the inlet entrance portion comprises a first cross-sectional area, wherein the inlet exit portion comprises a second cross-section area, and wherein the first cross-sectional area and the second cross-sectional area are different.

Example 21—The nuclear component handling arrangement of Example 20, wherein the first cross-sectional area is less than the second cross-sectional area.

Example 22—The nuclear component handling arrangement of any of one Examples 9-21, wherein the curved portion is a first curved portion, and wherein the passive cooling system comprises a second curved portion.

Example 23—The nuclear component handling arrangement of Example 22, wherein the first curved portion comprises a first radius of curvature, wherein the second curved portion comprises a second radius of curvature, and wherein the first radius of curvature and the second radius of curvature are different.

Example 24—A nuclear component handling arrangement for housing a canister containing nuclear waste, the nuclear component handling arrangement comprising a storage overpack comprising an inner envelope, wherein the canister is positionable within the storage overpack, and a passive cooling system comprising an inlet vent, an outlet vent, and a duct extending between the inlet vent and the outlet vent. The inlet vent comprises an inlet horn, an inlet exit portion, and a curved portion connecting the inlet horn and the inlet exit portion.

Example 25—The nuclear component handling arrangement of Example 24, wherein the outlet vent comprises an outlet horn and an outlet entrance portion.

Example 26—The nuclear component handling arrangement of Example 25, wherein the outlet vent further comprises a curved portion extending between the outlet entrance portion and the outlet horn.

Example 27—The nuclear component handling arrangement of any of one Examples 24-26, wherein the inlet horn comprises first cross-sectional area, wherein the inlet exit portion comprises a second cross-section area, and wherein the first cross-sectional area and the second cross-sectional area are different.

Example 28—The nuclear component handling arrangement of Example 27, wherein the first cross-sectional area is less than the second cross-sectional area.

Example 29—The nuclear component handling arrangement of any of one Examples 24-18, wherein the curved portion is a first curved portion, and wherein the passive cooling system comprises a second curved portion.

Example 30—The nuclear component handling arrangement of Example 29, wherein the first curved portion comprises a first radius of curvature, wherein the second curved portion comprises a second radius of curvature, and wherein the first radius of curvature and the second radius of curvature are different.

Unless specifically stated otherwise as apparent from the foregoing disclosure, it is appreciated that, throughout the foregoing disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc.," is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A nuclear component handling arrangement, comprising:
 a storage overpack comprising an inner envelope;
 an inner canister comprising an outer envelope, wherein the inner canister is positionable within the storage overpack; and
 a vent and duct system, comprising:
  an inlet vent, comprising:
   an inlet entrance;
   an inlet exit; and
   a curved transition surface extending between the inlet entrance and the inlet exit;

an outlet vent; and
a passageway defined between the inner envelope of the storage overpack and the outer envelope of the inner canister, wherein the passageway extends between the inlet vent and the outlet vent;
wherein the inlet vent further comprises a horn comprising:
an inlet defining an inlet cross-sectional area; and
an outlet defining an outlet cross-sectional area smaller than the inlet cross-sectional area, wherein the outlet of the horn is coupled to the inlet entrance of the inlet vent.

2. The nuclear component handling arrangement of claim 1, wherein the outlet vent comprises:
an outlet entrance;
an outlet exit; and
a curved transition surface extending between the outlet entrance and the outlet exit.

3. The nuclear component handling arrangement of claim 1, wherein the inlet entrance comprises a first cross-sectional area, wherein the inlet exit comprises a second cross-sectional area, and wherein the first cross-sectional area and the second cross-sectional area are different.

4. The nuclear component handling arrangement of claim 1, wherein the curved transition surface is a first curved transition surface, wherein the inlet vent further comprises a second curved transition surface extending between the inlet entrance and the inlet exit, wherein the first curved transition surface comprises a first radius of curvature, wherein the second curved transition surface comprises a second radius of curvature, and wherein the first radius of curvature and the second radius of curvature are different.

5. The nuclear component handling arrangement of claim 1, wherein the cannister is configured to hold spent nuclear fuel for dry storage.

6. A nuclear component handling arrangement, comprising:
a storage overpack comprising an inner envelope;
an inner canister comprising an outer envelope, wherein the inner canister is positionable within the storage overpack; and
a passive cooling system, comprising:
an inlet vent, comprising:
an inlet entrance portion;
an inlet exit portion; and
a curved portion connecting the inlet entrance portion and the inlet exit portion;
an outlet vent; and
a duct defined between the inner envelope of the storage overpack and the outer envelope of the inner canister, wherein the duct extends between the inlet vent and the outlet vent;
wherein the inlet vent further comprises a horn comprising:
an inlet defining an inlet cross-sectional area; and
an outlet defining an outlet cross-sectional area smaller than the inlet cross-sectional area, wherein the outlet of the horn is coupled to the inlet entrance of the inlet vent.

7. The nuclear component handling arrangement of claim 6, wherein the inlet entrance portion defines a horizontal passage leading to the curved portion, and wherein the inlet exit portion defines a vertical passage leading to the duct.

8. The nuclear component handling arrangement of claim 6, wherein the duct is an annular duct.

9. The nuclear component handling arrangement of claim 6, wherein the curved portion extends along a curved central axis, and wherein the curved portion maintains a uniform cross-sectional shape along the curved central axis.

10. The nuclear component handling arrangement of claim 6, wherein the curved portion extends along a curved central axis, and wherein the curved portion comprises a plurality of different cross-sectional shapes along the curved central axis.

11. The nuclear component handling arrangement of claim 6, wherein the curved portion comprises a first section and a second section narrower than the first section.

12. The nuclear component handling arrangement of claim 6, wherein the curved portion extends along a curved central axis.

13. The nuclear component handling arrangement of claim 6, wherein the outlet vent comprises:
an outlet entrance portion;
an outlet exit portion; and
a curved portion extending between the outlet entrance portion and the outlet exit portion.

14. The nuclear component handling arrangement of claim 6, wherein the inlet entrance portion comprises a first cross-sectional area, wherein the inlet exit portion comprises a second cross-sectional area, and wherein the first cross-sectional area and the second cross-sectional area are different.

15. The nuclear component handling arrangement of claim 6, wherein the curved portion is a first curved portion, wherein the inlet vent further comprises a second curved portion connecting the inlet entrance portion and the inlet exit portion, wherein the first curved portion comprises a first radius of curvature, wherein the second curved portion comprises a second radius of curvature, and wherein the first radius of curvature and the second radius of curvature are different.

16. A nuclear component handling arrangement for housing a canister containing nuclear waste, the nuclear component handling arrangement comprising:
a storage overpack comprising an inner envelope, wherein the canister is positionable within the storage overpack; and
a passive cooling system, comprising:
an inlet vent, comprising:
a horn comprising:
an inlet defining an inlet cross-sectional area; and
an outlet defining an outlet cross-sectional area smaller than the inlet cross sectional area;
an inlet entrance portion, wherein the outlet of the horn is coupled to the inlet entrance portion;
an inlet exit portion; and
a curved portion connecting the horn and the inlet exit portion;
an outlet vent; and
a duct extending between the inlet vent and the outlet vent.

17. The nuclear component handling arrangement of claim 16, wherein the horn is a first horn, wherein the outlet vent comprises:
a second horn comprising:
a second inlet defining a second inlet cross-sectional area; and
a second outlet defining a second outlet cross-sectional area smaller than the second inlet cross-sectional area;
an outlet entrance portion;
an outlet exit portion, wherein the second inlet of the second horn is coupled to the outlet exit portion; and a curved portion extending between the outlet entrance portion and the outlet exit portion.

18. The nuclear component handling arrangement of claim 16, wherein the curved portion is a first curved portion, wherein the inlet vent comprises a second curved portion connecting the horn and the inlet exit portion, wherein the first curved portion comprises a first radius of curvature, wherein the second curved portion comprises a second radius of curvature, and wherein the first radius of curvature and the second radius of curvature are different.

* * * * *